United States Patent
Medles et al.

(10) Patent No.: US 12,177,150 B2
(45) Date of Patent: *Dec. 24, 2024

(54) METHOD AND APPARATUS FOR SLOT AGGREGATION DESIGN IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Cambridge (GB); Chiao Yao Chuang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,759

(22) Filed: Dec. 14, 2023

(65) Prior Publication Data

US 2024/0113829 A1    Apr. 4, 2024

Related U.S. Application Data

(63) Continuation of application No. 16/906,277, filed on Jun. 19, 2020, now Pat. No. 11,895,046.
(Continued)

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ... H04L 5/0048; H04L 5/0044; H04L 5/0094; H04L 5/0051; H04L 25/0204; H04L 1/1812; H04L 1/1854; H04W 72/0446
See application file for complete search history.

(56) References Cited

U.S. PATENT DOCUMENTS

| | | | |
|---|---|---|---|
| 2019/0222380 A1 | 7/2019 | Manolakos et al. | |
| 2019/0230656 A1 | 7/2019 | Soriaga et al. | |

(Continued)

FOREIGN PATENT DOCUMENTS

| | | |
|---|---|---|
| CN | 103428775 A | 12/2013 |
| CN | 103428777 A | 12/2013 |
| CN | 105409316 A | 3/2016 |

OTHER PUBLICATIONS

Wang et al., "The Evolution of LTE Physical Layer Control Channels", IEEE Communications Surveys & Tutorials, vol. 18. No. 2, Second Quarter 2016 (Year: 2016).*

(Continued)

*Primary Examiner* — Justin T Van Roie
(74) *Attorney, Agent, or Firm* — Andy M. Han; Han IP PLLC

(57) ABSTRACT

Various solutions for slot aggregation design in non-terrestrial network (NTN) communications with respect to user equipment and network apparatus in mobile communications are described. An apparatus may receive a demodulation reference signal (DMRS) time bundling configuration. The apparatus may determine a duration interval of the DMRS time bundling configuration. The apparatus may perform channel estimation cross slots based on the duration interval.

6 Claims, 5 Drawing Sheets

Related U.S. Application Data

(60) Provisional application No. 62/876,836, filed on Jul. 22, 2019.

(56) References Cited

U.S. PATENT DOCUMENTS

| | | |
|---|---|---|
| 2020/0260416 A1 | 8/2020 | Kim et al. |
| 2020/0367242 A1 | 11/2020 | Moon et al. |
| 2021/0007107 A1* | 1/2021 | Peng ............... H04L 1/1819 |
| 2022/0007455 A1 | 1/2022 | Hong |

OTHER PUBLICATIONS

China National Intellectual Property Administration, First Office Action in China Patent Application No. 202010697102.9, Jun. 22, 2023.
Qualcomm Incorporated: "Evaluation of DL DMRS design", 3GPP TSG RAN WG1 Meeting #89, R1-1708598, May 19, 2017.

* cited by examiner

METHOD AND APPARATUS FOR SLOT AGGREGATION DESIGN IN NON-TERRESTRIAL NETWORK COMMUNICATIONS

CROSS REFERENCE TO RELATED PATENT APPLICATION(S)

The present disclosure is part of a continuation of U.S. patent application Ser. No. 16/906,277, filed on 19 Jun. 2020 and claiming the priority benefit of U.S. Patent Application No. 62/876,836, filed on 22 Jul. 2019. Contents of aforementioned applications are herein incorporated by reference in their entirety.

TECHNICAL FIELD

The present disclosure is generally related to mobile communications and, more particularly, to slot aggregation design in non-terrestrial network (NTN) communications with respect to user equipment and network apparatus in mobile communications.

BACKGROUND

Unless otherwise indicated herein, approaches described in this section are not prior art to the claims listed below and are not admitted as prior art by inclusion in this section.

A non-terrestrial network (NTN) refers to a network, or a segment of network(s), using radio frequency (RF) resources on board a satellite or an unmanned aircraft system (UAS) platform. A typical scenario of an NTN providing access to a user equipment (UE) involves either NTN transparent payload, with the satellite or UAS platform acting as a relay, or NTN regenerative payload, with a base station (e.g., gNB) on board the satellite or UAS platform.

In Long-Term Evolution (LTE) or New Radio (NR), hybrid automatic repeat request (HARQ) procedure is introduced to improve transmission reliability. The user equipment (UE) needs to report HARQ-acknowledgement (HARQ-ACK) information for corresponding downlink transmissions in a HARQ-ACK codebook. The HARQ procedure may involve a plurality of HARQ processes (e.g., 8 HARQ processes). Each downlink transmission may associate with one HARQ process identifier (ID). The HARQ process ID is used to identify a unique HARQ process. The same HARQ process ID can be used to identify a re-transmission of data. This can enable the UE to make use of the repeated transmission for soft combining. To perform soft combining, incorrectly received coded data blocks are often stored at the receiver (e.g., stored in the soft buffer) rather than discarded, and when the re-transmitted block is received, the two blocks are combined. The soft buffer may be implemented as buffers or memories for storing the soft combining data.

In NTN communications, the long propagation delay is expected and leads to very long HARQ round trip time ($RTT_{HARQ}$). The HARQ RTT is time interval between initial transmission and retransmission. If the HARQ RTT increases, the quality of service (QoS) requirement of the retransmitted packet would not be satisfied by increased end-to-end latency. Thus, these very long HARQ RTT times in NTN communications lead to an increase in the minimum number of required HARQ processes. This represents a challenge since the NR terrestrial network only allows for 16 HARQ processes. Increasing the number of HARQ processes may lead to higher soft buffer requirements leading to higher UE implementation complexity and cost. Instead of increasing the number of HARQ processes leading to soft buffer requirements, long delay in $RTT_{HARQ}$ may lead to disabling of the HARQ feedback mechanism. In order to reduce soft buffering at the UE, HARQ soft buffering requirement may be relaxed. However, to guarantee good reliability, some schemes such as proper slot aggregation design may be proposed to guarantee better performance.

Accordingly, for the long HARQ round trip time in NTN communications, how to design/support slot aggregation to improve performance becomes an important issue in the newly developed wireless communication network. Therefore, there is a need to provide proper schemes for performing slot aggregation transmissions to meet latency requirements while disabling the HARQ feedback mechanism to relax soft buffering requirements.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to slot aggregation design in NTN communications with respect to user equipment and network apparatus in mobile communications.

In one aspect, a method may involve an apparatus receiving a demodulation reference signal (DMRS) time bundling configuration. The method may also involve the apparatus determining a duration interval of the DMRS time bundling configuration. The method may further involve the apparatus performing channel estimation cross slots based on the duration interval.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving a DMRS time bundling configuration. The processor may also perform operations comprising determining a duration interval of the DMRS time bundling configuration. The processor may further perform channel estimation cross slots based on the duration interval.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
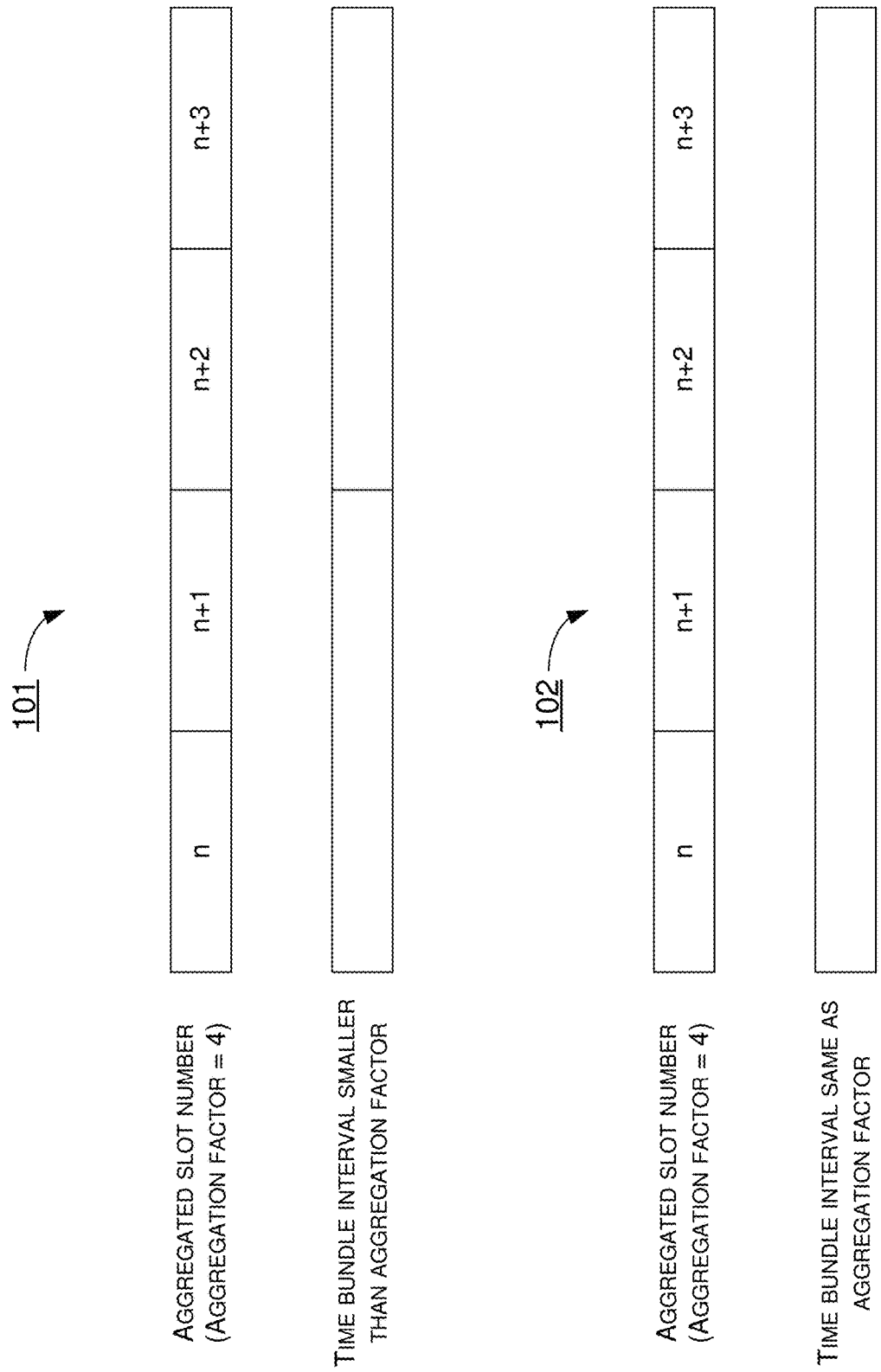
FIG. 1 is a diagram depicting example scenarios under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to slot aggregation design in NTN communications with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NTN communications, long propagation delay is expected and leads to very long HARQ round trip time ($RTT_{HARQ}$). The HARQ RTT is the time interval between initial transmission and retransmission. For terrestrial communications, the maximum $RTT_{HARQ}$ may be 16 milliseconds (ms), and the minimum number of HARQ processes ($N_{HARQ,min}$) required for 1 ms slot operation may be 16. For low earth orbit (LEO) communications, the maximum $RTT_{HARQ}$ may be 50 ms, and the $N_{HARQ,min}$ required for 1 ms slot operation may be 50. For medium earth orbit (MEO) communications, the maximum $RTT_{HARQ}$ may be 180 ms, and the $N_{HARQ,min}$ required for 1 ms slot operation may be 180. For geosynchronous equatorial orbit (GEO)/highly elliptical orbit (HEO) communications, the maximum $RTT_{HARQ}$ may be 600 ms, and the $N_{HARQ,min}$ required for 1 ms slot operation may be 600.

If the HARQ RTT increases, the quality of service (QoS) requirement of the retransmitted packet would not be satisfied by increased end-to-end latency. Thus, these very long HARQ RTT times in NTN communications lead to an increase in the minimum number of required HARQ processes. This represents a challenge since the NR terrestrial network only allows for 16 HARQ processes. Increasing the number of HARQ processes may lead to higher soft buffer requirements leading to higher UE implementation complexity and cost. Instead of increasing the number of HARQ processes leading to soft buffer requirements, long delay in $RTT_{HARQ}$ may lead to disabling of the HARQ feedback mechanism. In order to reduce soft buffering at the UE, HARQ soft buffering requirement may be relaxed. However, to guarantee good reliability, some schemes such as proper slot aggregation design may be proposed to guarantee better performance.

In view of the above, the present disclosure proposes a number of schemes pertaining to slot aggregation design in NTN communications with respect to the UE and the network apparatus. According to the schemes of the present disclosure, the UE may be able to support higher aggregation levels for slot aggregation. On the other hand, self-decodability may become critical at the UE in order to ensure that performance is not degraded by disabling the HARQ feedback mechanism. In addition, demodulation reference signal (DMRS) time bundling may be used to improve channel estimate in case of slot aggregation. Accordingly, the UE may be able to meet latency requirements while disabling the HARQ feedback mechanism to relax soft buffering requirements. The complexity, cost and requirements on UE design and implementation may be relaxed and may have more flexibility.

Specifically, slot aggregation means that data transmission may be scheduled to span one or multiple slots. For example, one downlink control information (DCI) may indicate multiple slots (e.g., a group of radio resources in multiple slots) for downlink data transmission. In NR Release-15, the supported aggregation factor of slot aggregation comprises only 2, 4 and 8. This represents that the slot numbers that can be aggregated is limited to 8 slots. According to the schemes of the present disclosure, the UE and/or network node may be configured to support higher aggregation levels such as 12, 16, 24, 32, 48, 64, etc. to improve performance. Higher aggregation levels may provide more coding gains and lower block error rate to improve reliability. Such improvement may be applicable to NR-NTN capable UEs. Such improvement may be alternatively subject to the case when HARQ feedback is disabled. The UE and/or network node may be configured to use higher aggregation levels when HARQ feedback is disabled.

When HARQ feedback mechanism is disabled (e.g., no HARQ-ACK feedback) or when soft buffering requirement is relaxed (e.g., no soft buffering required on the HARQ processes), self-decodable transmissions may be supported in order to ensure that performance are not degraded by (re)transmission using non-decodable redundancy version (RV). For NR channel coding, RV0 is always self-decodable, RV1 is not self-decodable, and RV2 requires low coding rate to be self-decodable while RV3 is self-decodable at moderate coding rate. Therefore, some designs may be proposed to ensure self-decodability at the receiver side. For example, the transmitter may be restricted to use RV0 for conveying the control signalling (e.g., DCI signalling).

Alternatively, the transmitter may be restricted to use RV0 or RV3 for conveying the control signalling since RV0 and RV3 are self-decodable at the receiver. On the other hand, for cases of RV cycling is applied, the RV cycling may need to be re-designed to improve performance. For example, the RV cycling used in slot aggregation may be disabled and the RV used for transmission in slot aggregation may be fixed to RV0. Alternatively, the RV cycling used in slot aggregation may be changed and made to cycle over (RV0, RV3). For example, in an event that DCI signals RV0: transmission n, then n modulo 2=0 may use RV0 while n modulo 2=1 may use RV3. In an event that DCI signals RV3: transmission n, then n modulo 2=0 may use RV3 while n modulo 2=1 may use RV1. The DCI RV field number of bits may be 0 in an event that only RV0 is used, or 1 in an event that RV0 and RV3 are used.

In NTN, if UE is in very low signal-to-noise ratio (SNR) conditions, the use of slot aggregation allows to achieve lower effective coding rate. However, in these low SNR conditions, channel estimation error may lead to large performance degradation. Therefore, DMRS time domain bundling over the aggregated slots can allow cross slot channel estimation so as to improve the channel estimate quality. This is achievable for slot aggregation and comes at no cost for NTN since the transmitting precoder is unlikely to change across the different slots because of limited number of transmitting antennas in NTN scenarios (e.g., 1 or 2 transmitting antennas) and the absence of multi-paths at the satellite side in case of the downlink.

Thus, to improve channel estimate in case of slot aggregation, the DMRS time bundling may be configured. The DMRS time bundling means that the UE can average the channel over multiple slots which allows to improve the channel estimation and hence improve channel quality and throughput. For downlink, configuration of DMRS time bundling allows the UE to perform channel estimation cross slots of the same aggregated slots transmission to improve performance. For uplink, configuration of DMRS time bundling requires the UE to guarantee phase continuity cross slots thus to allow the network node (e.g., gNodeB) to perform channel estimation cross slots of the same aggregated transmission to improve performance.

Specifically, the UE may be configured to receive a DMRS time bundling configuration. The UE may determine a duration interval of the DMRS time bundling configuration. The duration interval may comprise a plurality of slots that can be bundled for performing channel estimation. Then, the UE may perform channel estimation cross slots based on the duration interval. The DMRS time bundling configuration may be signalled explicit or implicit (e.g., through NTN transmission configuration or signalling of gNodeB usage of 1 transmitting antenna). The UE may receive the DMRS time bundling configuration via an explicit signaling or an implicit signaling.

In some implementations, the duration interval of the DMRS time bundling may be the same as the slot aggregation factor or may be made smaller. Specifically, the UE may receive a slot aggregation configuration. The UE may determine an aggregation factor of the slot aggregation configuration. The UE may receiver downlink data cross slots based on the aggregation factor. In an event that the duration interval of the DMRS time bundling is always the same as the slot aggregation factor, the signalling for the duration interval of the DMRS time bundling signalling may be not needed. The UE may determine the duration interval of the DMRS time bundling configuration according to the aggregation factor when the duration interval is identical to the aggregation factor. In an event that the duration interval of the DMRS time bundling can be different from the slot aggregation factor, the signalling for the duration interval of the DMRS time bundling may be needed in this case. The UE may determine the duration interval of the DMRS time bundling configuration according to a signaling when the duration interval is different from the aggregation factor.

FIG. 1 illustrates example scenarios 101 and 102 under schemes in accordance with implementations of the present disclosure. Scenarios 101 and 102 involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). In scenario 101, the duration interval of the DMRS time bundling is smaller than the aggregation factor of slot aggregation. The aggregation factor is equal to 4 which means that the aggregated slot number may comprises 4 slots. The duration interval (e.g., time bundle interval) of the DMRS time bundling may comprise 2 slots. In this case, since the duration interval of the DMRS time bundling is different from the aggregation factor of slot aggregation, the network node may transmit a signalling to indicate the duration interval of the DMRS time bundling signalling. The UE may determine the duration interval of the DMRS time bundling signalling according to the signalling. The signalling may comprise a radio resource control (RRC) signalling or a physical layer signalling. In scenario 102, the duration interval of the DMRS time bundling is the same as the aggregation factor of slot aggregation (e.g., 4 slots). In this case, the network node may not need to transmit a signalling to indicate the duration interval of the DMRS time bundling signalling. The UE may determine the duration interval of the DMRS time bundling signalling according to the aggregation factor of slot aggregation.

In some implementations, for DMRS associated with a physical downlink shared channel (PDSCH), the UE may be configured to infer a first channel over which a PDSCH symbol on one antenna port is conveyed from a second channel over which a DMRS symbol on the same antenna port is conveyed when the PDSCH symbol and the DMRS symbol are within same resources as the PDSCH symbol in the same slot in an event that the DMRS time bundling configuration is not configured. Alternatively, the UE may be configured to infer a first channel over which a PDSCH symbol on one antenna port is conveyed from a second channel over which a DMRS symbol on the same antenna port is conveyed when the PDSCH symbol and the DMRS symbol are within same resources as the PDSCH symbol in consecutive slots in an event that the DMRS time bundling configuration is configured and the aggregation factor is greater than 1.

In case multi-slot scheduling of several transport blocks (TBs) using the same DCI, the DMRS time domain bundling may be configured over the multiple slots in a similar way to slot aggregation as described above. Multi-slot scheduling means that a single DCI or control information may schedule multiple packets over multiple slots. However, in case when slot aggregation/multi-slot scheduling are not used, in the downlink the UE has no information on what slots belongs to the same DMRS time domain bundle. Thus, to provide the UE with the information in the downlink on what slots belong to the same time domain bundle, some solutions may be proposed. For example, a configuration of grid for the DMRS time domain bundle may be used. Alternatively, a dynamic signalling of the DMRS time domain bundling may be introduced.

Figure 2:
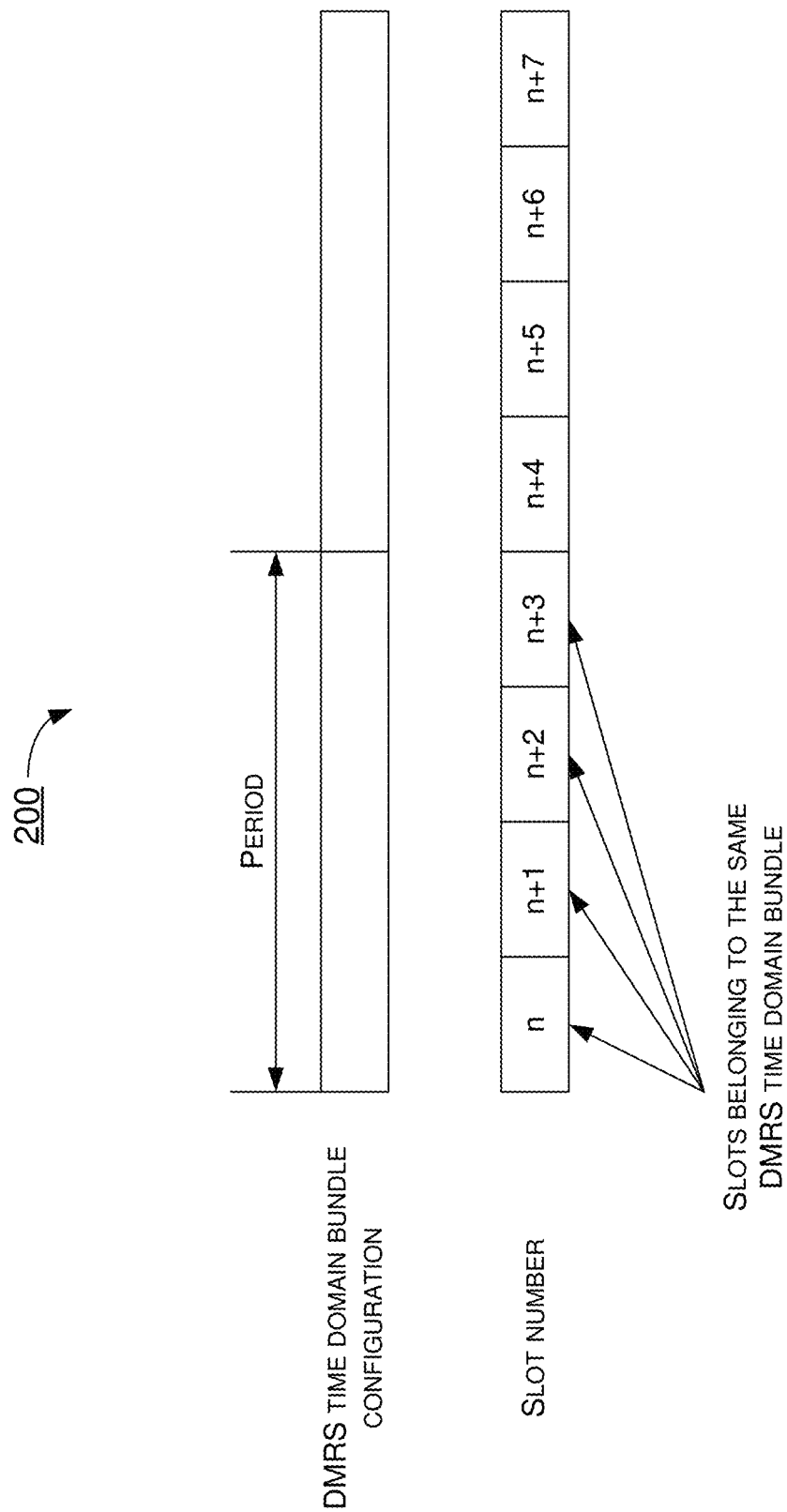
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). In scenario 200, the UE may be configured with a fixed grid for the DMRS time domain bundle. The configuration of the DMRS time domain bundle may be composed of an offset and periodicity. For example, such configuration may comprise the same periodicity of a periodic channel state information (CSI) reporting or sounding reference signal (SRS) transmission but with an offset. All the slots that are transmitted within a given period of the grid (e.g., slot n to n+3) may be considered to belong to the same DMRS time domain bundle. The UE may be configured to determine the duration interval of the DMRS time bundling configuration according to at least one of a periodicity and an offset.

Figure 3:
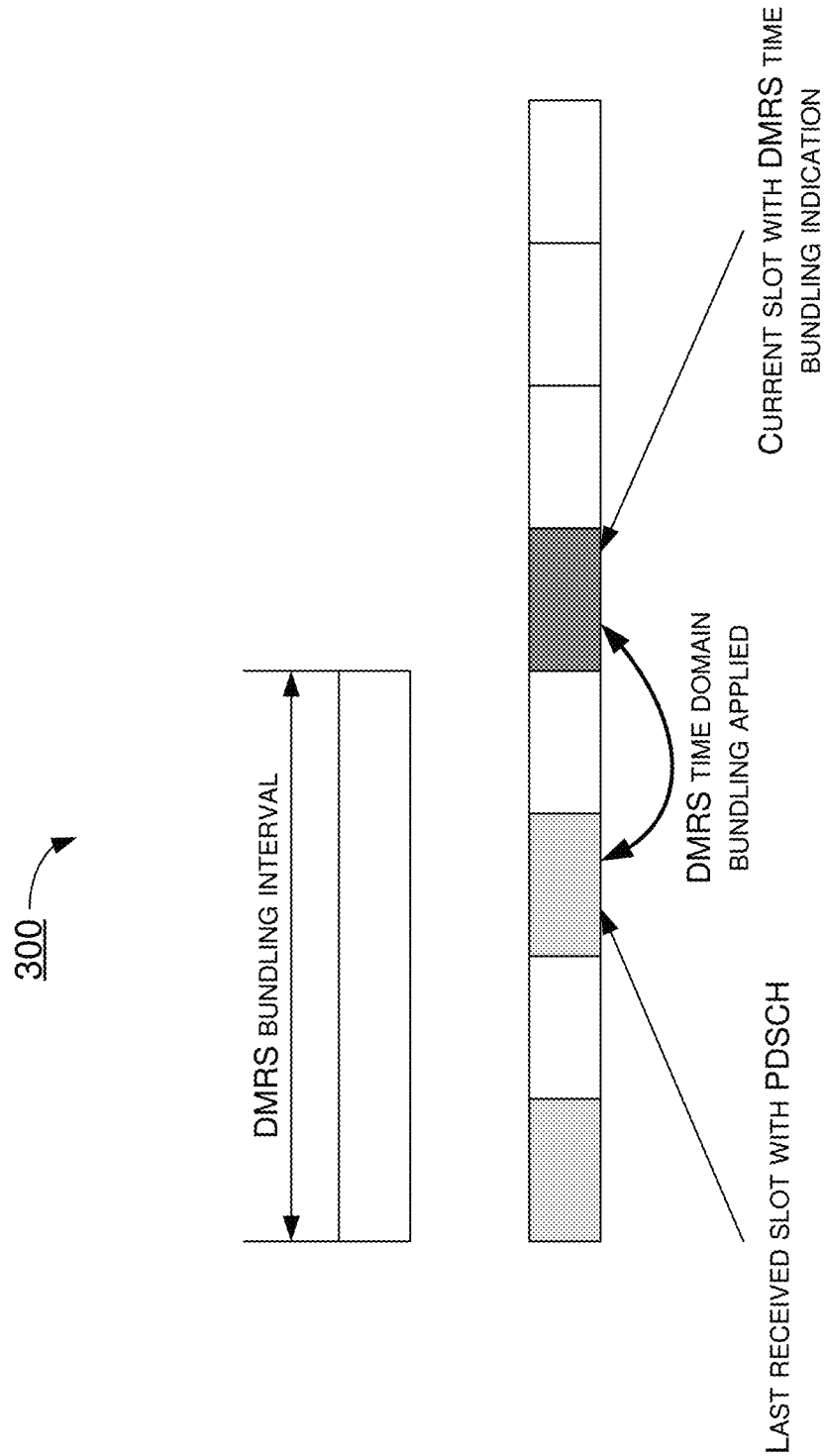
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). In scenario 300, a dynamic signalling may be used to signal that the current slot DMRS is time bundled with a previous slot. The UE may be configured to determine that a current slot is DMRS time bundled with a previous slot according to the dynamic signaling. This may be implemented by dedicating a DCI field to signal that the current slot is DMRS time bundled with previous slots. For example, the DCI may comprise an indication of the position of the previous slot index. The range of the slot index position may further be configured. Alternatively, the previous slot index may be fixed to the directly preceding downlink slot. Another alternative, an interval may be configured and on receiving the DCI with DMRS time bundling indication of the current slot, the UE may assume that DMRS time bundling applies between the current slot and the last applicable slot within the interval that contains the PDSCH as shown in scenario 300. The UE may apply potential conditions on the number of special layers and antenna ports.

Illustrative Implementations

Figure 4:
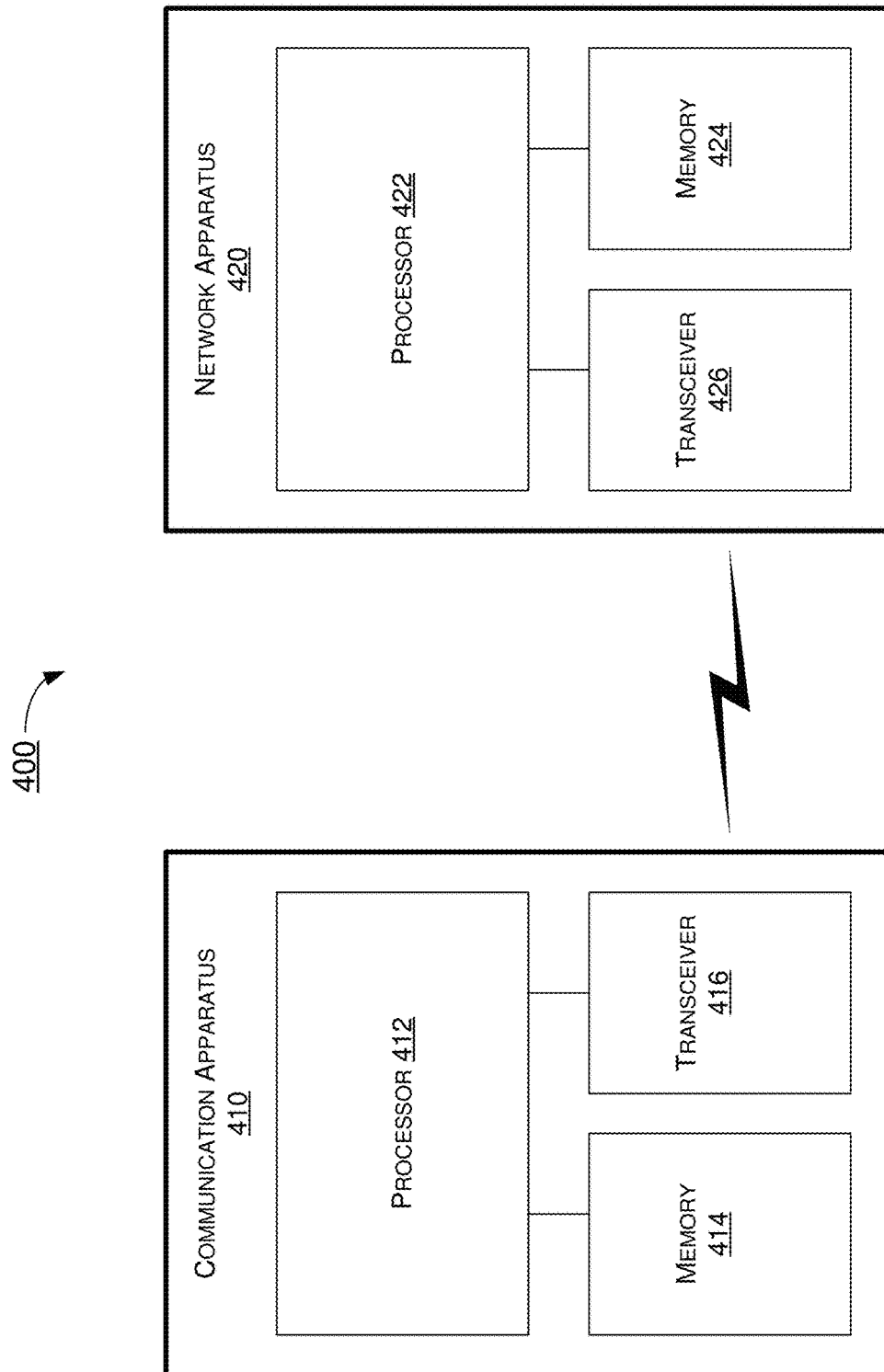
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to slot aggregation design in NTN communications with respect to user equipment and network apparatus in wireless communications, including scenarios/schemes described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT, NB-IoT or IIoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 and/or processor 422 may be configured to support higher aggregation levels such as 12, 16, 24, 32, 48, 64, etc. to improve performance. Such improvement may be applicable to NR-NTN capable communication apparatus 410 and/or network apparatus 420. Processor 412 and/or processor 422 may be configured to use higher aggregation levels when HARQ feedback is disabled.

In some implementations, when HARQ feedback mechanism is disabled or when soft buffering requirement is relaxed, processor 412 and/or processor 422 may be configured to support self-decodable transmissions to ensure that performance are not degraded by (re)transmission using non-decodable RV. For example, processor 422 may be restricted to use RV0 for conveying the control signalling (e.g., DCI signalling). Alternatively, processor 422 may be restricted to use RV0 or RV3 for conveying the control signalling since RV0 and RV3 are self-decodable at the receiver. On the other hand, processor 422 may be configured to disable the RV cycling in slot aggregation. The RV used by processor 422 for transmission in slot aggregation may be fixed to RV0. Alternatively, processor 422 may change the RV cycling used in slot aggregation to cycle over (RV0, RV3). Processor 422 may configure the DCI RV field number of bits as 0 in an event that only RV0 is used, or 1 in an event that RV0 and RV3 are used.

In some implementations, processor 412 may be configured to receive, via transceiver 416, a DMRS time bundling configuration. Processor 412 may determine a duration interval of the DMRS time bundling configuration. The duration interval may comprise a plurality of slots that can be bundled for performing channel estimation. Then, processor 412 may perform channel estimation cross slots based on the duration interval. Processor 412 may receive the DMRS time bundling configuration via an explicit signaling or an implicit signaling.

In some implementations, processor 412 may receive, via transceiver 416, a slot aggregation configuration. Processor 412 may determine an aggregation factor of the slot aggregation configuration. Processor 412 may receiver downlink data cross slots based on the aggregation factor. In an event that the duration interval of the DMRS time bundling is always the same as the slot aggregation factor, the signalling for the duration interval of the DMRS time bundling signalling may be not needed. Processor 412 may determine the duration interval of the DMRS time bundling configuration according to the aggregation factor when the duration interval is identical to the aggregation factor. In an event that the duration interval of the DMRS time bundling can be different from the slot aggregation factor, the signalling for the duration interval of the DMRS time bundling may be needed in this case. Processor 412 may determine the duration interval of the DMRS time bundling configuration according to a signaling when the duration interval is different from the aggregation factor.

In some implementations, the duration interval of the DMRS time bundling may be different from the aggregation factor of slot aggregation, processor 422 may transmit, via transceiver 426, a signalling to indicate the duration interval of the DMRS time bundling signalling. Processor 412 may determine the duration interval of the DMRS time bundling signalling according to the signalling.

In some implementations, the duration interval of the DMRS time bundling may be the same as the aggregation factor of slot aggregation. Processor 422 may not need to transmit a signalling to indicate the duration interval of the DMRS time bundling signalling. Processor 412 may determine the duration interval of the DMRS time bundling signalling according to the aggregation factor of slot aggregation.

In some implementations, processor 412 may be configured to infer a first channel over which a PDSCH symbol on one antenna port is conveyed from a second channel over which a DMRS symbol on the same antenna port is conveyed when the PDSCH symbol and the DMRS symbol are within same resources as the PDSCH symbol in the same slot in an event that the DMRS time bundling configuration is not configured.

In some implementations, processor 412 may be configured to infer a first channel over which a PDSCH symbol on one antenna port is conveyed from a second channel over which a DMRS symbol on the same antenna port is conveyed when the PDSCH symbol and the DMRS symbol are within same resources as the PDSCH symbol in consecutive slots in an event that the DMRS time bundling configuration is configured and the aggregation factor is greater than 1.

In some implementations, processor 412 may be configured with a fixed grid for the DMRS time domain bundle. The configuration of the DMRS time domain bundle may be composed of an offset and periodicity. Processor 412 may be configured to determine the duration interval of the DMRS time bundling configuration according to at least one of a periodicity and an offset.

In some implementations, processor 422 may use a dynamic signalling signal that the current slot DMRS is time bundled with a previous slot. Processor 412 may be configured to determine that a current slot is DMRS time bundled with a previous slot according to the dynamic signaling. Processor 422 may use a dedicated DCI field to signal that the current slot is DMRS time bundled with previous slots. For example, processor 422 may include an indication of the position of the previous slot index in the DCI. Processor 422 may further configure the range of the slot index position. Alternatively, processor 422 may configure that the previous slot index to be fixed to the directly preceding downlink slot. Another alternative, processor 422 may configure an interval and on receiving the DCI with DMRS time bundling indication of the current slot, processor 412 may assume that DMRS time bundling applies between the current slot and the last applicable slot within the interval that contains the PDSCH. Processor 412 may apply potential conditions on the number of special layers and antenna ports.

Figure 5:
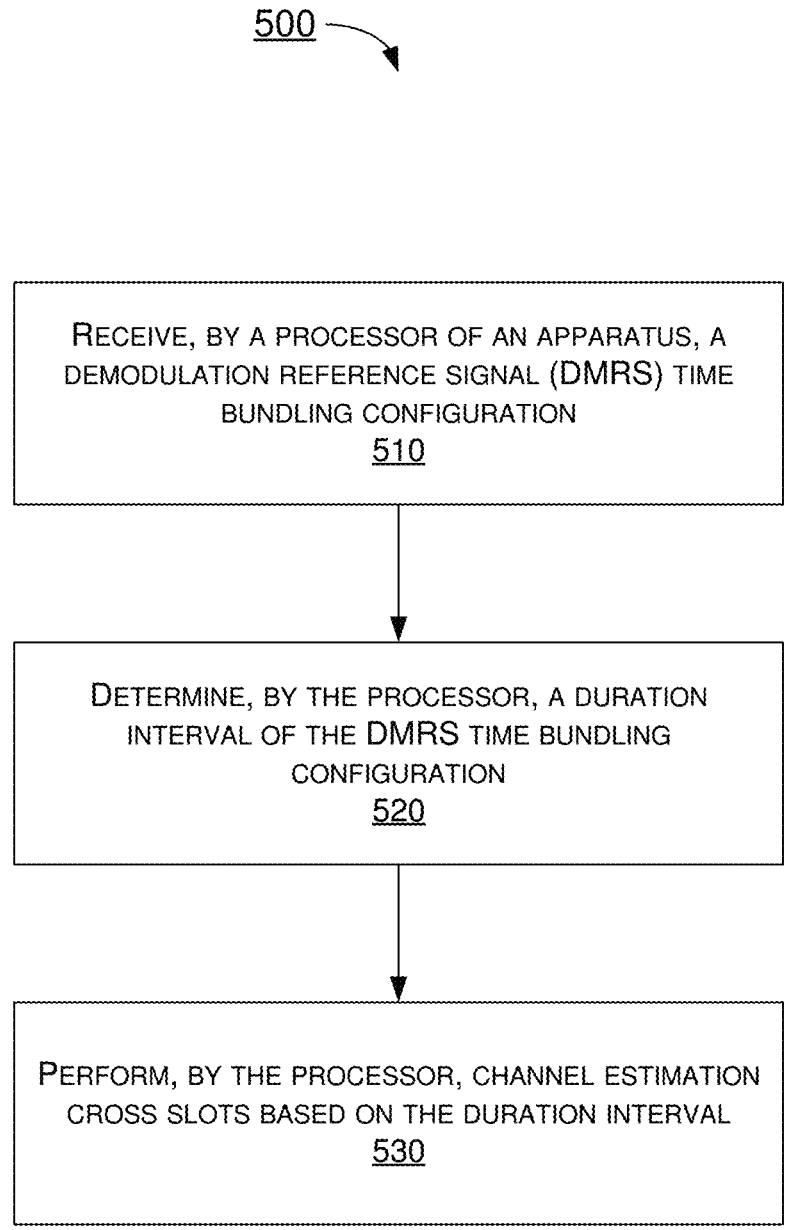
FIG. 5 is a flowchart of an example process in accordance with an implementation of the present disclosure.

FIG. 5 illustrates an example process 500 in accordance with an implementation of the present disclosure. Process 500 may be an example implementation of above scenarios/ schemes, whether partially or completely, with respect to slot aggregation design in NTN communications with the present disclosure. Process 500 may represent an aspect of implementation of features of network apparatus 420. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by network apparatus 420 or any suitable network nodes or network elements. Solely for illustrative purposes and without limitation, process 500 is described below in the context of network apparatus 420. Process 500 may begin at block 510.

At 510, process 500 may involve processor 422 of apparatus 420 receiving a DMRS time bundling configuration. Process 500 may proceed from 510 to 520.

At 520, process 500 may involve processor 422 determining a duration interval of the DMRS time bundling configuration. Process 500 may proceed from 520 to 530.

At 530, process 500 may involve processor 422 performing channel estimation cross slots based on the duration interval.

In some implementations, process 500 may involve processor 422 receiving a slot aggregation configuration. Process 500 may also involve processor 322 determining an aggregation factor of the slot aggregation configuration. Process 500 may further involve processor 322 receiving downlink data cross slots based on the aggregation factor.

In some implementations, process 500 may involve processor 422 determining the duration interval of the DMRS time bundling configuration according to the aggregation factor when the duration interval is identical to the aggregation factor.

In some implementations, process 500 may involve processor 422 determining the duration interval of the DMRS time bundling configuration according to a signaling when the duration interval is different from the aggregation factor.

In some implementations, process 500 may involve processor 422 inferring a first channel over which a PDSCH symbol on an antenna port is conveyed from a second channel over which a DMRS symbol on the antenna port is conveyed when the PDSCH symbol and the DMRS symbol are within same resources as the PDSCH symbol in one slot in an event that the DMRS time bundling configuration is not configured.

In some implementations, process 500 may involve processor 422 inferring a first channel over which a PDSCH symbol on an antenna port is conveyed from a second channel over which a DMRS symbol on the antenna port is conveyed when the PDSCH symbol and the DMRS symbol are within same resources as the PDSCH symbol in consecutive slots in an event that the DMRS time bundling configuration is configured.

In some implementations, process 500 may involve processor 422 receiving the DMRS time bundling configuration via an explicit signaling or an implicit signaling.

In some implementations, the aggregation factor of the slot aggregation configuration is greater than 8.

In some implementations, process 500 may involve processor 422 determining the duration interval of the DMRS time bundling configuration according to at least one of a periodicity and an offset.

In some implementations, process 500 may involve processor 422 determining that a current slot is DMRS time bundled with a previous slot according to a dynamic signaling.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A network node, comprising:
    a transceiver which, during operation, wirelessly communicates with UE of a wireless network; and
    a processor communicatively coupled to the transceiver such that, during operation, the processor performs operations comprising:
        transmitting, via the transceiver, a demodulation reference signal (DMRS) time bundling configuration used in non-terrestrial network (NTN) communications; and
        performing channel estimation cross slots of same aggregated slots transmitted in the NTN communications based on a duration interval of the of the DMRS time bundling configuration,
    wherein, in transmitting the DMRS time bundling configuration, the processor transmits the DMRS time bundling configuration via an explicit signaling of an NTN transmission configuration.

2. The network node of claim 1, wherein, during operation, the processor further performs operations comprising:
    transmitting, via the transceiver, a slot aggregation configuration; and
    transmitting downlink data cross slots based on an aggregation factor, wherein the aggregation factor is related to the slot aggregation configuration.

3. The network node of claim 2, wherein the duration interval of the DMRS time bundling configuration is determined according to the aggregation factor when the duration interval is identical to the aggregation factor.

4. The network node of claim 2, wherein the duration interval is determined according to a signaling when the duration interval is different from the aggregation factor.

5. The network node of claim 2, wherein the aggregation factor of the slot aggregation configuration is greater than 8.

6. A method, comprising:
    transmitting, by a processor of an apparatus, a demodulation reference signal (DMRS) time bundling configuration in a downlink (DL) transmission in non-terrestrial network (NTN) communications; and
    performing, by the processor, the DL transmission in the NTN communications while maintaining phase continuity cross slots according to a duration interval of the DMRS time bundling configuration,
    wherein the transmitting of the DMRS time bundling configuration comprises transmitting the DMRS time bundling configuration via an explicit signaling of an NTN transmission configuration.

* * * * *